Sept. 16, 1930.  L. McSPADEN  1,775,731
WARNING SIGNAL
Filed Nov. 20, 1922
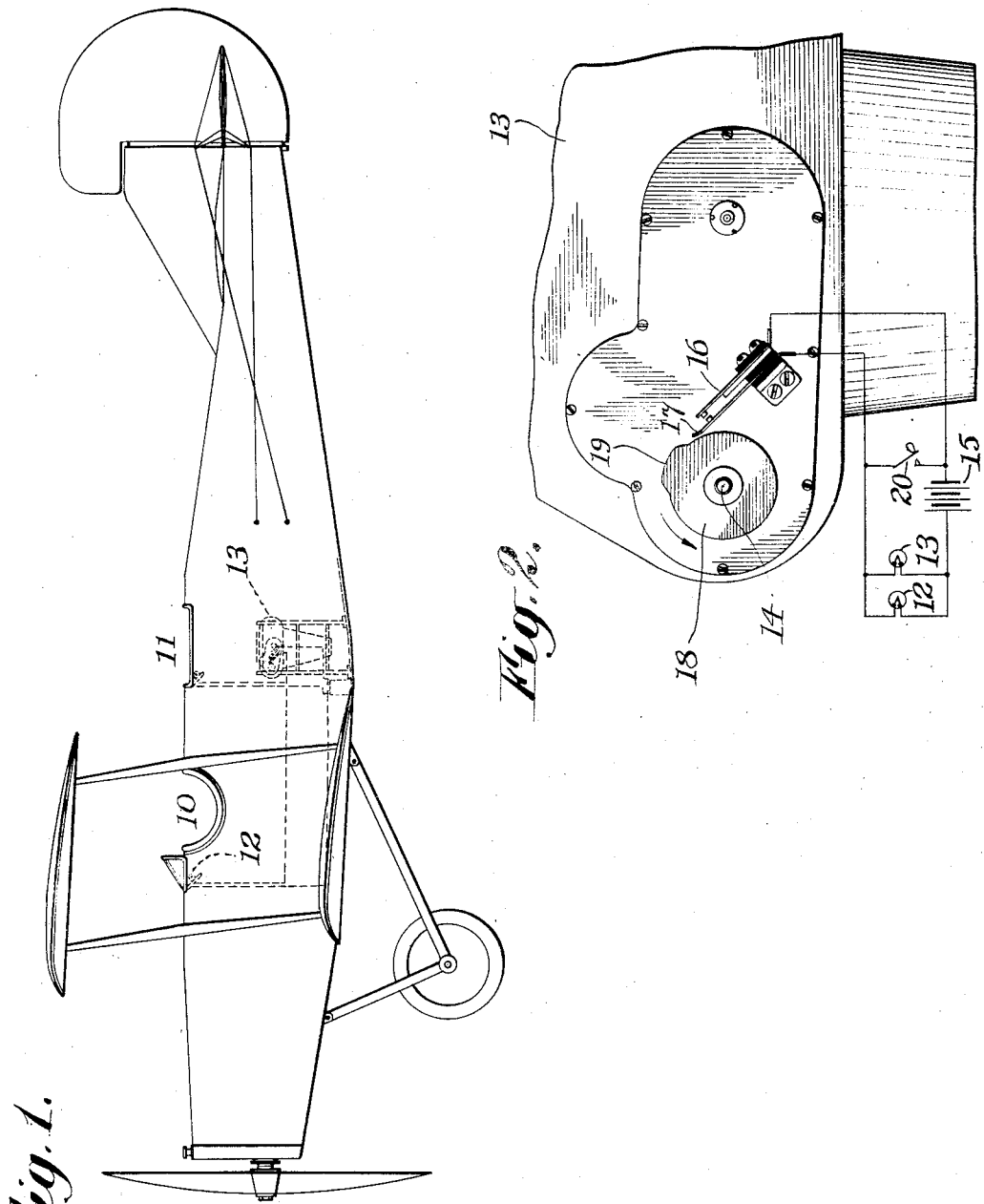
Inventor
Lewis McSpaden
By his Attorneys
Cooper, Kerr & Dunham Patented Sept. 16, 1930

1,775,731

UNITED STATES PATENT OFFICE

LEWIS McSPADEN, OF NEW YORK, N. Y., ASSIGNOR TO FAIRCHILD AERIAL CAMERA CORPORATION, OF NEW YORK, N. Y., A CORPORATION OF NEW YORK

WARNING SIGNAL

Application filed November 20, 1922. Serial No. 602,007.

In taking an aerial photograph it is usually desirable that the airplane shall not be accelerated during the exposure, and also, when the photographs are to be used for making a "mosaic" map or print, that the plane be following the proper course. This means that the pilot, as well as the photographer, should know when an exposure is about to be made, so that he can rectify his course if necessary, avoid accelerating and keep the plane at a speed which is as nearly as possible constant in amount and direction. It is accordingly the chief object of my present invention to provide simple and effective means for giving the pilot a signal, preferably a visible signal, before each exposure, preferably while the camera is being made ready, or after it has been made ready, for exposure, as by changing the plate or film and setting the shutter. To this and other ends the invention consists in the novel features and combinations hereinafter described.

One form of the invention is illustrated in the accompanying drawing, in which,

Fig. 1 is a side elevation of an airplane having a camera equipped with my invention;

Fig. 2 is a detail side view of a portion of the camera, showing the signaling circuit and the controlling devices therefor.

In the airplane shown, the positions of the pilot and photographer are indicated at 10 and 11, respectively. Conveniently located where it can be readily seen by the pilot, is an electric lamp 12, which is used to warn the pilot before the exposure and for that purpose is caused to glow at appropriate times as hereinafter described. The camera, shown in dotted lines at 13, Fig. 1, is of any suitable cyclical type, operating periodically and having a shaft or other suitable part which is actuated for one purpose or another in preparing for the exposure, as for example in changing the film or plate. This shaft, shown at 14, Fig. 2, may be, in a film camera, the one by which the take-up film-spool is rotated to draw the film from the supply spool into the exposure field. Inasmuch as this spindle revolves in changing the film it affords convenient and suitable means for actuating or controlling the signaling devices, in the present instance the lamps 12 and 13.

The lamps are in parallel with each other but in series with a battery or other source of current 15 and with a pair of normally open spring contacts 16, 17, which may be mounted on the outside of camera adjacent to the shaft or spindle 14. The latter is equipped with a cam 18, preferably of insulating material, having a hump or rise 19 by which the contacts are closed and opened once in each operation of changing the film. And of course when the circuit is thus closed the lamps are lighted, thereby indicating to the pilot and to the photographer that the camera is being prepared for the next exposure.

The cam may be positioned to close the circuit before or at the beginning of the operation, or at or after the end, or at any intermediate time, as for instance a few seconds before the end. Thus in a camera arranged for making exposures at regular intervals of say, thirty seconds, under the control of a timing mechanism (not shown), the cam may be timed to operate the signaling system about five seconds before the exposure, which, in general, gives the pilot sufficient time to rectify his course as well as cease accelerating before the shutter is released.

If the exposures are made at the will of the photographer instead of under the control of an automatic timing mechanism, the intervals between exposures may be irregular, in which case the photographer can close the contacts 16, 17, by hand at an appropriate instant if the exposure has been delayed longer than usual. Or, if the contacts are inaccessible, a normally open key or pair of contacts 20, Fig. 2, bridged across the other contacts, may be arranged within convenient reach. Preferably, also, the rise on the cam is of such length as to escape the contacts and thus open the circuit again just before the film-changing operation is completed.

It is to be understood that the invention is not limited to the construction herein specifically illustrated and described but can be embodied in other forms without departure from its spirit. Although the invention is devised particularly for aerial photography it can be employed to advantage with cameras for other purposes, wherever it is desired to give a warning, or to indicate that a cycle of operation or any portion of a cycle has been performed.

I claim:—

1. In aerial photographic apparatus, in combination, an airplane having a position for a pilot, a camera carried by the airplane and having a part actuated in each operation of preparing the camera for exposure, electrical signalling means, arranged to signal the pilot in such position and having a circuit, and means for controlling said circuit, actuated by said part to give a signal to the pilot in advance of each exposure.

2. In aerial photographic apparatus, in combination, an airplane having a pilot's position and a photographer's position, electric signal lamps arranged to be seen from said position, a circuit for said lamps, an automatic periodically operating aerial camera having a part which must undergo actuation in the operation of preparing the camera for exposure, and controlling means actuated by said part, to light the lamps and warn the pilot and photographer before each exposure that the exposure is about to be made.

In testimony whereof I hereto affix my signature.

LEWIS McSPADEN.